US012664493B2

(12) United States Patent
Kajiwara et al.

(10) Patent No.: US 12,664,493 B2
(45) Date of Patent: *Jun. 23, 2026

(54) VEHICLE MANAGEMENT SYSTEM, VEHICLE MANAGEMENT DEVICE, AND VEHICLE MANAGEMENT METHOD

(71) Applicant: Nissan Motor Co., Ltd., Kanagawa (JP)

(72) Inventors: Shingo Kajiwara, Kanagawa (JP); Takehiro Miyoshi, Kanagawa (JP); Seigo Watanabe, Kanagawa (JP); Kazumasa Fujita, Kanagawa (JP); Hiroya Fujimoto, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/652,536

(22) Filed: May 1, 2024

(65) Prior Publication Data

US 2024/0281734 A1 Aug. 22, 2024

Related U.S. Application Data

(63) Continuation of application No. 16/958,519, filed as application No. PCT/IB2018/001478 on Dec. 5, 2018, now Pat. No. 12,001,979.

(30) Foreign Application Priority Data

Dec. 27, 2017 (JP) ................................. 2017-252034

(51) Int. Cl.
*G06Q 10/0631* (2023.01)
*G01C 21/34* (2006.01)
(Continued)

(52) U.S. Cl.
CPC ... *G06Q 10/06312* (2013.01); *G01C 21/3438* (2013.01); *G06Q 10/02* (2013.01);
(Continued)

(58) Field of Classification Search
None
See application file for complete search history.

(56) References Cited

U.S. PATENT DOCUMENTS 9,009,067 B1 4/2015 Scotto et al.
10,026,055 B2 7/2018 Riel-Dalpe et al.
(Continued)

FOREIGN PATENT DOCUMENTS

JP H10-9880 A 1/1998
JP 2000-161971 A 6/2000
(Continued)

OTHER PUBLICATIONS

Tan, YongChai, et al. "A new automated food delivery system using autonomous track guided centre-wheel drive robot." 2010 IEEE conference on sustainable utilization and development in engineering and technology. IEEE, 2010 (Year: 2010).*

(Continued)

*Primary Examiner* — Darlene Garcia-Guerra
(74) *Attorney, Agent, or Firm* — Osha Bergman Watanabe & Burton LLP

(57) ABSTRACT

Terminal used by a user includes a transmitter configured to transmit desire information required for determining a desired facility desired by the user to a server via a telecommunications network. The server includes a destination setting unit configured to set a destination of a vehicle on the basis of the desire information and a facility information acquisition unit configured to acquire, via the telecommunications network, facility information including information indicative of an empty situation of the desired facility.

(Continued)

The vehicle includes an arrival time adjustment unit configured to manage a travel of the vehicle on the basis of the facility information to adjust an arrival time at which the vehicle arrives at the destination.

6 Claims, 11 Drawing Sheets

(51) Int. Cl.
  *G06Q 10/02* (2012.01)
  *G06Q 50/40* (2024.01)
  *H04W 4/02* (2018.01)

(52) U.S. Cl.
  CPC ....... *G06Q 10/06315* (2013.01); *G06Q 50/40* (2024.01); *H04W 4/023* (2013.01)

(56) References Cited

U.S. PATENT DOCUMENTS

| | | | |
|---|---|---|---|
| 2006/0010037 A1* | 1/2006 | Angert | G06Q 30/0601 |
| | | | 705/15 |
| 2006/0241862 A1 | 10/2006 | Ichihara et al. | |
| 2009/0281850 A1 | 11/2009 | Bruce et al. | |
| 2009/0307096 A1 | 12/2009 | Antonellis | |
| 2011/0050900 A1 | 3/2011 | Sato | |
| 2013/0027561 A1 | 1/2013 | Lee et al. | |
| 2015/0206081 A1 | 7/2015 | Lee et al. | |
| 2015/0208043 A1 | 7/2015 | Lee et al. | |
| 2015/0276412 A1 | 10/2015 | Cudak et al. | |
| 2015/0338852 A1 | 11/2015 | Ramanujam | |
| 2016/0350837 A1* | 12/2016 | Williams | G06Q 50/12 |
| 2017/0011319 A1* | 1/2017 | Elliot | G06Q 30/06 |
| 2017/0024789 A1 | 1/2017 | Frehn et al. | |
| 2017/0122764 A1 | 5/2017 | Nakahara et al. | |
| 2017/0220957 A1* | 8/2017 | Lee | G06Q 10/02 |
| 2018/0060827 A1 | 3/2018 | Abbas et al. | |
| 2018/0082353 A1 | 3/2018 | Mattingly et al. | |
| 2018/0089621 A1* | 3/2018 | Perez Barrara | G06Q 10/0833 |
| 2018/0158153 A1* | 6/2018 | Ekin | B60P 3/0257 |
| 2018/0181128 A1 | 6/2018 | Urano | |
| 2018/0211541 A1 | 7/2018 | Rakah et al. | |
| 2018/0308038 A1* | 10/2018 | Zhou | G06Q 10/063114 |
| 2018/0315022 A1 | 11/2018 | Yamamoto et al. | |
| 2018/0341277 A1* | 11/2018 | Yang | H04L 67/125 |
| 2019/0012625 A1* | 1/2019 | Lawrenson | G06Q 10/06311 |
| 2019/0086223 A1* | 3/2019 | Tanaka | G06F 16/00 |
| 2019/0109910 A1* | 4/2019 | Sweeney | H04W 48/18 |
| 2019/0270458 A1* | 9/2019 | Shimotani | G06F 3/04817 |
| 2019/0325758 A1* | 10/2019 | Yoshii | G06V 20/586 |

FOREIGN PATENT DOCUMENTS

| | | | | |
|---|---|---|---|---|
| JP | 2002-150470 A | 5/2002 | | |
| JP | 2005-018697 A | 1/2005 | | |
| JP | 2006-170814 A | 6/2006 | | |
| JP | 2011-53828 A | 3/2011 | | |
| JP | 2016-184410 A | 10/2016 | | |
| WO | 2006/070583 A1 | 7/2006 | | |
| WO | WO-2017179285 A1 * | 10/2017 | ............ | G09B 29/00 |
| WO | 2017/208754 A1 | 12/2017 | | |

OTHER PUBLICATIONS

Krueger, Rico, Taha H. Rashidi, and John M. Rose. "Preferences for shared autonomous vehicles." Transportation research part C: emerging technologies 69 (2016): 343-355 (Year: 2016).*

International Search Report issued in Application No. PCT/IB2018/001478, mailed on Apr. 2, 2019 (3 pages).

International Preliminary Report on Patentability issued in Application No. PCT/IB2018/001478, mailed on Jan. 6, 2020 (12 pages).

Office Action issued in counterpart Chinese Patent Application No. 201880084118.3 mailed on Aug. 31, 2023 (30 pages).

Kovacs, Attila A. et al.; "Vehicle Routing Problems in Which Consistency Considerations are Important: A Survey"; Networks, vol. 64, No. 3, Oct. 2014, pp. 192-213 (22 pages).

Bran, David M. et al.; "Simulation Of Restaurant Operations Using The Restaurant Modeling Studio"; Proceedings of the 2002 Winter Conference, pp. 1448-1453 (6 pages).

Dorling, K. et al.; "Vehicle Routing Problems for Drone Delivery"; IEE Transactions on Systems, Man, and Cybernetics: Systems, vol. 47, No. 1, Jan. 2017, pp. 70-85 (16 pages).

Nasrallah, Yamen Y. et al.; "Distributed Time Synchronization Mechanism For Large-Scale Vehicular Networks"; 2016 International Conference on Selected Topics in Mobile & Wireless Networking (MoWNet) (6 pages).

Roy, D. et al.; "A nested semi-open queuing network model for analyzing dine-in restaurant performance"; Computers & Operations, vol. 65, Jan. 2016, pp. 29-41 (13 pages).

* cited by examiner

Fig. 3

| Matching level | | ◎ | ○ | | ◎ | |
|---|---|---|---|---|---|---|
| Desired experience (input items) | Budget (including transport service) | Up to 3,000 yen | Up to 3,000 yen | Up to 4,000 yen | Up to 3,000 yen | |
| | Return time | ~19:00 | ~19:00 | ~24:00 | ~20:00 | ~23:00 |
| | Desired time slot | 15:00~16:00 | Afternoon | Night | Afternoon | Night |
| | Deboarding location | | | | | |
| | Boarding location (current location) | | | | | |
| | Range of destination | Within Kanagawa | Within Kanagawa | Within Tokyo | Within Kanagawa | Within Tokyo |
| | Abstract content (plain dish, local dish) | Want to eat X | Want to eat X' | Want to see Y | Want to eat X | Want to eat Z |
| | Genre | Meal | Meal | Sightseeing | Meal | Meal |
| User | Hometown, hobby, etc. | United States | United States | China | Canada | China |
| | Current location | 35, 139 | 33, 139 | 34, 140 | 35, 141 | 35, 139 |
| | Generation | 20s | 20s | 20s | 20s | 30s |
| | Gender | Female | Female | Male | Female | Male |
| | Name | A | B | C | D | E |

Fig. 4

| NO | Name of restaurant | Location | Rough moving time (time from user's location to destination) | Available reservation time | Gourmet website evaluation | Total score of community | Score of each user |
|----|----|----|----|----|----|----|----|
| 1 | Restaurant L | Yokohama city, Kanagawa | | 15:00-17:00 | 4.5 | 90 | |
| 2 | Restaurant M | Yokohama city, Kanagawa | | 17:00-19:00 | 3.0 | 75 | |
| 3 | Restaurant N | Machida city, Tokyo | | 15:00-16:00 | 4.2 | 70 | |
| 4 | ... | ... | | ... | ... | | |

Fig. 5

| Name of restaurant | Location | Rough moving time (time from user's location to destination) | Available reservation time | Gourmet website evaluation | Budget range | Return time | Attribute of community (number of guests, gender, generation) |
|---|---|---|---|---|---|---|---|
| Restaurant L | Yokohama city, Kanagawa | | 15:00-16:00 | 4.5 | 3,000 yen to 4,000 yen | 18:00 | Three, Females, Visitors |

Fig. 6

Allocated vehicle: Passenger automobile (four-seater)

| Schedule ID | S1 | Point P1 | Point P2 | Point P3 | Restaurant L |
|---|---|---|---|---|---|
| Stop place | Vehicle allocation center | | | | |
| Arrival time | - | 14:14 | 14:29 | 14:44 | 15:00 |
| Departure time | 14:00 | 14:15 | 14:30 | 14:45 | - |
| Boarding user | | A | B | D | |

Fig. 10

| Reservation No. | Reserving person's name | Table No. | Reservation time | Status (updated every 5 minutes) | Estimated exit time |
|---|---|---|---|---|---|
| 1 | AAA | 1 | 14:00-16:00 | Under accounting | 15:30 |
| 2 | BBB | 2 | 15:00-16:30 | Having meals | 16:00 |
| 3 | CCC | 3 | 15:00-16:30 | Waiting for dishes | 16:30 |
| 4 | ... | | ... | | ... |

START

S51 Execute travel control with normal travel plan

S52 All reserving persons have got on vehicle?

No

Yes

S53 Change arrival time?

No

Yes

S54 Execute travel control with changed travel plan

END

VEHICLE MANAGEMENT SYSTEM, VEHICLE MANAGEMENT DEVICE, AND VEHICLE MANAGEMENT METHOD

CROSS-REFERENCE TO RELATED APPLICATIONS

The present application is a continuation application of U.S. patent application Ser. No. 16/958,519, which is a national stage application of PCT/IB2018/001478, and claims priority to Japanese Patent Application No. 2017-252034, the contents of which are incorporated by reference in their entirety. The present application claims priority based on Japanese Patent Application No. 2017-252034 filed on Dec. 27, 2017. For those designated countries which permit the incorporation by reference, the content described and/or illustrated in the above application is incorporated by reference in the present application as part of the description and/or drawings of the present application.

TECHNICAL FIELD

The present invention relates to a vehicle management system, a vehicle management device, and a vehicle management method.

BACKGROUND

An ordering method of placing an order from a mobile device is known (Patent Document 1: JP2016-184410A). This method includes the steps of acquiring context information indicating the state of a road around one or more facilities over a network, selecting the nearest facility of the one or more facilities on the basis of the current location of the mobile device and the context information, and transmitting the order to the selected nearest facility over the network by means of the mobile device. In this method, locational information of a customer is used to schedule an ordered process at appropriate timing on the basis of the arrival time at which the customer is expected to arrive at the facility.

[Prior Art Patent Document 1] JP2016-184410A.

SUMMARY

Problems to be Solved by Invention

According to the above ordering method, however, a restaurant (including the concept of a store or shop) in the facility does not always have empty seats, so even when a user arrives at the facility at the expected arrival time, the user may not be able to enjoy the service or the like ordered by the user.

A problem to be solved by the present invention is to provide a vehicle management system, a vehicle management device, and a vehicle management method with which the service or the like can be received in a desired facility to match the timing when the vehicle arrives at the facility.

Means for Solving Problems

The present invention solves the above problem through acquiring, by a server 1, desire information required for determining a desired facility desired by a user via a telecommunications network 3 from a terminal 2 used by the user, setting a destination of a vehicle having an autonomous (automated) driving function on the basis of the acquired desire information, acquiring, by the server 1, facility information including information indicative of an empty situation of the desired facility via the telecommunications network 3, and managing the travel of the vehicle on the basis of the facility information to adjust an arrival time at which the vehicle arrives at the destination.

Effect of Invention

According to the present invention, the usage rate of a service using vehicles can be improved.

BRIEF DESCRIPTION OF DRAWINGS

FIG. 3 is a diagram illustrating an example of a desired experience list generated by a community generation unit of FIG. 1.

FIG. 4 is a diagram illustrating an example of the result of destination candidate search executed by a destination proposal unit of FIG. 1.

FIG. 5 is a diagram illustrating an example of proposed information transmitted from the destination proposal unit of FIG. 1 to each of terminals used by users.

FIG. 6 is a diagram illustrating an example of a vehicle allocation schedule generated by a vehicle-allocation-schedule generation unit of FIG. 1.

FIG. 10 is a diagram illustrating an example of facility information managed in a server of FIG. 1.

DETAILED DESCRIPTION

Figure 1:
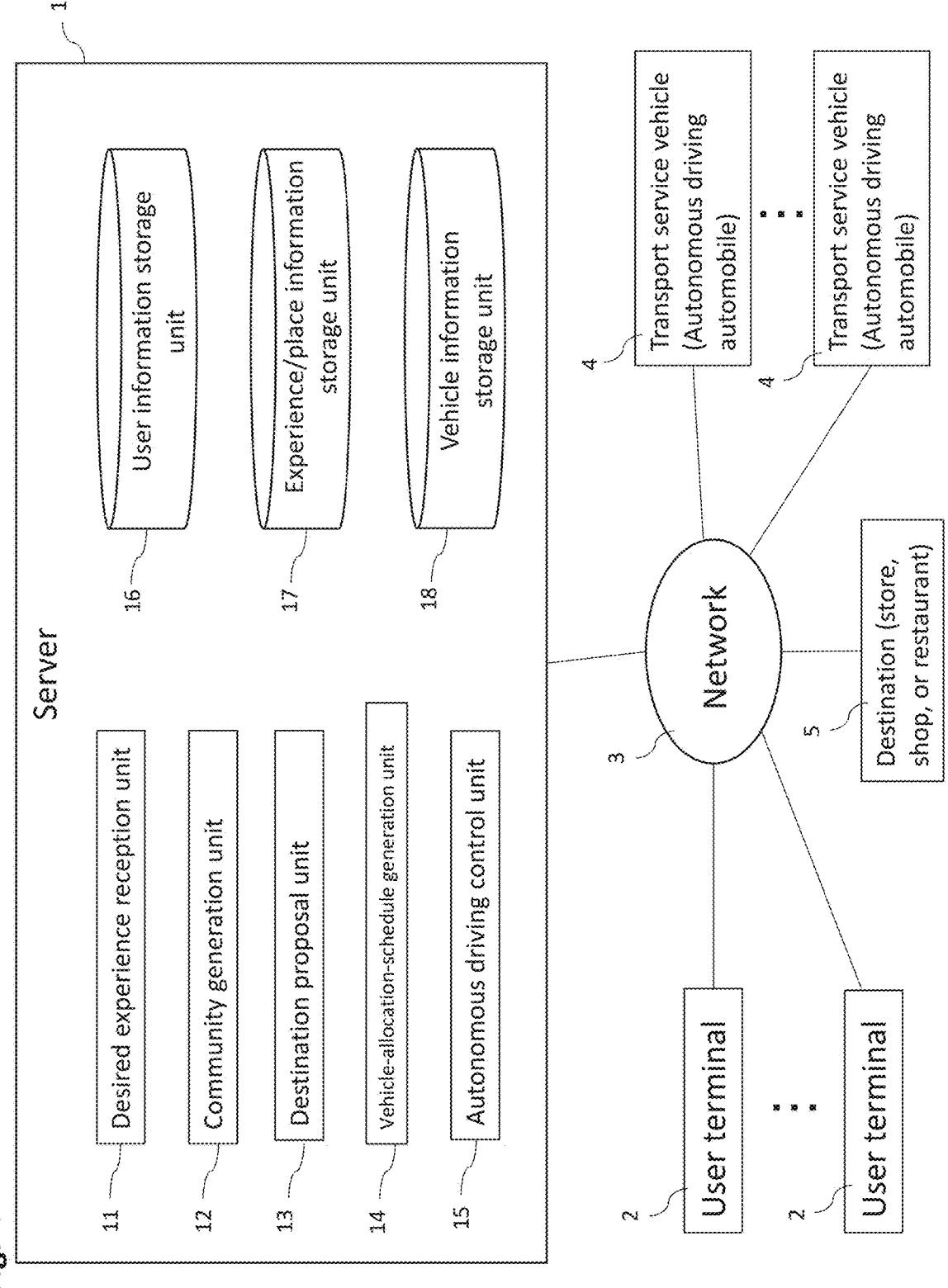
FIG. 1 is a block diagram illustrating one or more embodiments of a vehicle management system according to the present invention.

Hereinafter, one or more embodiments of a vehicle management system according to the present invention will be described with reference to the drawings. FIG. 1 is a block diagram illustrating a vehicle management system according to one or more embodiments of the present invention. The system according to one or more embodiments of the present invention includes a server 1, a plurality of terminals 2 used by users, a network 3 that constitutes a telecommunications network, and one or more transport service vehicles 4. The system according to one or more embodiments of the present invention operates to determine a desired facility desired by users with reference to the conditions designated by the users and allocate a transport service vehicle 4 to transport the users to a destination. Then, the system operates to acquire facility information including information indicative of a current empty situation of the desired facility and manage the travel of the transport service vehicle 4 in accordance with the empty situation thereby to adjust the arrival time at the destination so that the users who arrive at the destination do not wait for a long time at the desired facility.

When the users can operate their mobile terminals to select a specific facility (such as a specific restaurant, amusement facility, or shopping facility), for example, the method of determining the desired facility desired by the users may include acquiring, by the server 1, desire information regarding the selected desired facility via the network 3 and determining the desired facility on the basis of the acquired desire information. Then, the location of the desired facility or a location around the desired facility is determined as the destination of the transport service vehicle 4.

In this operation, the desired facility does not necessarily have to be selected by the users. For example, the following method may be employed to determine the desired facility on the basis of the users' desired conditions. One or more embodiments of the present invention will be described below on the assumption that the location of the desired facility is the destination of the transport service vehicle 4, but the destination of the transport service vehicle 4 may be a location that is around the location of the desired facility and suitable for the transport service vehicle 4 to park or make a stop. For example, a user who has not determined a specific destination but has a vague desired experience transmits information regarding the desired experience to the server 1, which thereby operates to extract other users who desire a similar experience. After grouping these users into a single community, the server 1 operates to extract a destination (desired facility) that most matches the desired experience from a database and propose the destination to the users who constitute the community. That is, the information regarding the desired experience is an example of desire information necessary for determining a desired facility desired by the users. Then, the service is rendered to allocate a transport service vehicle and transport the users who accepted the proposal to the destination while passing through the locations of the users and picking them up. The process of transporting the users to the destination includes a process of managing the travel of the transport service vehicle 4 in accordance with the empty situation of the desired facility thereby to adjust the arrival time at the destination so that the users who arrive at the destination do not wait for a long time at the desired facility.

Although not particularly limited, an example of the operation will be described to facilitate the understanding of the present invention. When a traveler A who visits an unfamiliar place has several hours until the next schedule and wants to eat local delicacy, especially "Okonomiyaki" (one of popular Japanese foods), he/she may usually conceive of a conventional way to search for a recommended Okonomiyaki restaurant on a gourmet website using a terminal such as a smartphone and move to the restaurant using a taxi or the like. According to this conventional restaurant search on a gourmet website, however, the place and name of the restaurant are displayed, but the traveler has to go to the restaurant by himself/herself, in which case the taxi fare may not be cheap, and even when using an inexpensive bus, the traveler may not know how to get to the restaurant because of the unfamiliar place. Moreover, this conventional way is very inconvenient because the traveler cannot know how long it takes time to get to the restaurant and return to the current location without using another search site such as a navigation site. In this context, the system according to one or more embodiments of the present invention operates to group the users who similarly want to eat Okonomiyaki, extract a recommended Okonomiyaki restaurant that is preliminarily stored, allocate a transport service vehicle to pick up the plurality of users at their current locations, and transport the users to the desired Okonomiyaki restaurant.

The "desired experience" according to one or more embodiments of the present invention means a matter which the user himself/herself wants to experience, and in the above-described example, refers to an experience of "wanting to have a meal," especially "wanting to eat Okonomiyaki." Examples of the "desired experience" include not only this kind of experience of wanting to have a meal but also other genres of experiences, such as experiences of wanting to go to sightseeing spots, to go shopping, to watch movies, to watch sports, and to go to hospitals. In the system according to one or more embodiments of the present invention, such various kinds of experiences are included.

The "desired facilities desired by users" according to one or more embodiments of the present invention include a facility that is selected by a user through the operation of the terminal 2 or the like, a facility that is selected by the server on the basis of the desired condition provided from a user to the server side, and a facility that is proposed by the server on the basis of the experience desired by a user as described above.

The server 1 according to one or more embodiments of the present invention is configured by a computer installed with hardware and software. Specifically, the server 1 is configured to include a read only memory (ROM) that stores programs, a central processing unit (CPU) that executes the programs stored in the ROM, and a random access memory (RAM) that serves as an accessible storage device. A micro processing unit (MPU), a digital signal processor (DSP), an application specific integrated circuit (ASIC), a field programmable gate array (FPGA), or the like can be used as an operation circuit as substitute for or in addition to the CPU. As illustrated in FIG. 1, the software established in the ROM achieves each of the functions, which will be described later, of a desired experience reception unit 11, a community generation unit 12, a destination proposal unit 13, a vehicle-allocation-schedule generation unit 14, and an autonomous driving control unit 15. In addition, storage units are provided, including a user information storage unit 16, an experience/place information storage unit 17, and a vehicle information storage unit 18. Using the information stored in the storage units, the software established in the ROM achieves each of the functions, which will be described later, of the desired experience reception unit 11, the community generation unit 12, the destination proposal unit 13, the vehicle-allocation-schedule generation unit 14, and the autonomous driving control unit 15.

The system according to one or more embodiments of the present invention will be described on the assumption that a number of persons who can be the users own the terminals 2 which are used or used on a daily basis. Examples of this type of terminals 2 for use include smartphones, mobile phones, and portable computers. Each terminal 2 according to one or more embodiments of the present invention has a computer function, specifically, an input unit for inputting data, which will be described later, a communication function for transmitting the input data to the desired experience reception unit 11 of the server 1, and a location detection function of a GPS receiver or the like that detects the current location of the terminal 2. Each terminal 2 transmits its own ID, current location, and input data to the desired experience reception unit 11 of the server 1 via a network 3 (wireless communication network) including the Internet. Specific examples of various information items input to the terminals 2 according to one or more embodiments of the present invention will be described later.

Vehicles having an autonomous driving function can be used as the transport service vehicles 4. More specifically, each of the transport service vehicles 4 can be any of an automobile that is equipped with a navigation device and has a function of controlling the travel control (speed control and steering control) in an autonomous manner but is driven by a human and an unmanned automobile that is equipped with a navigation device and controls the travel control (speed control and steering control) in a fully autonomous manner. The following one or more embodiments of the present invention will be described by exemplifying unmanned autonomous driving automobiles as those permitted by the road traffic regulations. When locational information (e.g., latitude/longitude) of way points and a destination 5 and node information regarding a travel route are input from the current location, each of the unmanned autonomous driving automobiles operates to execute the speed control and steering control, such as control of start, speed, stop, and right or left turn, in an autonomous manner while detecting the travel environment by means of a camera or the like, thereby picking up the users at the way points and transporting them to the destination 5. It is assumed that a number of such transport service vehicles 4 are prepared and wait at two or more prepared standby stations or wait for a travel command from the server 1 while traveling around a predetermined travel route.

The configuration of the server 1 will then be described. The desired experience reception unit 11 receives the information, which is transmitted from the terminal 2 used by each of a plurality of users, via the network 3 at a predetermined time interval (e.g., 100 msec). The desired experience reception unit 11 has a desire information acquisition unit as a functional block for acquiring the desire information. FIG. 3 is a diagram illustrating an example of the desired experience list generated by the community generation unit 12 of the server 1. As illustrated in FIG. 3, the information transmitted from a terminal 2 includes, in addition to the ID of the user who owns the terminal 2, a genre and abstract desired experience information that is a sub-category of the genre, the range of a destination, the boarding location, the deboarding location, the desired time slot for a desired experience, the return time to the deboarding location, the desired budget, etc. as information regarding the desired experience.

The user ID includes, for example, name, address, gender, generation (or age), hometown, hobby, etc. Each user accesses the system according to one or more embodiments of the present invention to preliminarily register these information items before using the system. The system according to one or more embodiments of the present invention operates to store the registered information of each user in the user information storage unit 16 of the server 1. When a user registered in the system according to one or more embodiments of the present invention uses the system, the user launches an execution program (such as application software) for the system installed in the terminal 2 and inputs a preliminarily assigned ID to connect to the server 1. The user information storage unit 16 of the server 1 stores the preliminarily registered attribute information, such as the name, address, gender, generation (or age), hometown, and hobby, in a form of being associated with the ID of each user. When a specific user accesses the server 1 using his/her ID, the server 1 can operate to recognize the attribute information stored in the user information storage unit 16.

Although illustration is omitted, when a user accesses the server 1 using the terminal 2, the terminal 2 used by the user displays a screen with which the user can input, as the above-described information regarding a desired experience, a genre and abstract desired experience information that is a sub-category of the genre, the range of a destination, the boarding location, the deboarding location, the desired time slot for the desired experience, the return time to the deboarding location, the desired budget, etc., and the user inputs the information regarding the desired experience for each item. Information on the current location of the terminal 2 transmitted to the desired experience reception unit 11 is detected as the latitude and longitude by a location detection sensor such as a GPS receiver provided in the terminal 2, and this locational information is transmitted to the desired experience reception unit 11 together with the information regarding the desired experience.

In the system according to one or more embodiments of the present invention, a genre and abstract desired experience information that is a sub-category of the genre, the range of a destination, the boarding location, the deboarding location, the desired time slot for the desired experience, the return time to the deboarding location, the desired budget, etc. have been exemplified as the information transmitted to the desired experience reception unit 11, but it is sufficient to transmit at least a genre and abstract desired experience information that is a sub-category of the genre, and other information such as the range of a destination, the boarding location, the deboarding location, the desired time slot for the desired experience, the return time to the deboarding location, and the desired budget may be transmitted as necessary. The user may manually input the desired experience information on the input screen displayed on the terminal 2, but another input method may also be employed, in which those frequently input are prepared in a pull-down menu for selection of one of them. Additionally or alternatively, for items that are not particularly concerned among these input information items, an item of "no desire" may be prepared or these items may be transmitted to the server 1 with blanks, thereby to allow for recognition that there is no special desire.

The example illustrated in FIG. 3 is made on the assumption that a user A (female, 20s, from the United States) is located at a latitude of 35° north and a longitude of 139° east, selects the genre of "meal," especially "wanting to eat X," and selects the range of a destination: "within Kanagawa," the desired time slot: "15:00 to 16:00," the return time: "until 19:00," and the desired budget: "up to 3,000 yen." Here, "X" is a specific food of the meal, such as the above-described "Okonomiyaki." The boarding location being blank means that she desires to board at the current location, and the deboarding location being blank means that she desires only to be transported to destination 5.

Likewise, it is assumed that a user B (female, 20s, from the United States) is located at a latitude of 33° north and a longitude of 139° east, selects the genre of "meal," especially "wanting to eat X'," and selects the range of a destination: "within Kanagawa," the desired time slot: "afternoon," the return time: "until 19:00," and the desired budget: "up to 3,000 yen," and the boarding location and the deboarding location are blank. Here, "X'" is a food similar to the Okonomiyaki X in the above-described example, such as Monjayaki (another one of popular Japanese foods).

Likewise, it is assumed that a user C (male, 20s, from China) is located at a latitude of 34° north and a longitude of 140° east, selects the genre of "sightseeing," especially "wanting to see Y," and selects the range of a destination: "within Tokyo," the desired time slot: "night," the return time: "until 24:00," and the desired budget: "up to 4,000 yen," and the boarding location and the deboarding location are blank.

Likewise, it is assumed that a user D (female, 20s, from Canada) is located at a latitude of 35° north and a longitude of 141° east, selects the genre of "meal," especially "wanting to eat X," and selects the range of a destination: "within Kanagawa," the desired time slot: "afternoon," the return time: "until 20:00," and the desired budget: "up to 3,000 yen," and the boarding location and the deboarding location are blank.

Likewise, it is assumed that a user E (male, 30s, from Canada) is located at a latitude of 35° north and a longitude of 139° east, selects the genre of "meal," especially "wanting to eat Z," and selects the range of a destination: "within Tokyo," the desired time slot: "night," and the return time: "until 23:00," and the desired budget, the boarding location, and the deboarding location are blank. Here, "Z" is a food that is not similar to the above-described Okonomiyaki X, such as Japanese "Soba" noodle.

The community generation unit 12 of FIG. 1 virtually lists the information regarding the desired experiences from users received by the desired experience reception unit 11 as illustrated in FIG. 3 and extracts the users, who transmitted the experience information having a similarity level not lower than a predetermined threshold, to generate a single community for the experience information of the users. The community generation unit 12 determines the similarity level of the experience information on the basis of the predetermined threshold, which is preliminarily determined in accordance with the genre and an abstract desired experience that is a sub-category of the genre. For example, when the genres themselves are different, such as "meal" and "sightseeing," the similarity level is less than a predetermined value, that is, they are dissimilar. Even when the genres are the same, if the abstract desired experiences, which are sub-categories in the genres, are contents that cannot be experienced at the same place, the similarity level is less than a predetermined value, that is, they are dissimilar. For example, in the example illustrated in FIG. 3, the users A, B, D, and E select the genre "meal" while the user C selects the genre "sightseeing," so the similarity level of the desired experiences is lower than a predetermined threshold, that is, a determination is made that they are dissimilar. The user C is therefore not extracted as a member of the single community.

Even in the users A, B, D, and E who select the same genre "meal," the user E is not extracted as a member of a single community that is constituted by the users A and D who select "wanting to eat X" and the user B who selects "wanting to eat X'" because the user E selects "wanting to eat Z" for which a determination is made that the abstract desired experience that is a sub-category of the genre is dissimilar. This is because a restaurant serving Okonomiyaki and/or Monjayaki is highly unlikely to be the same as a restaurant serving Japanese Soba noodle and these restaurants cannot be proposed as one destination 5. In contrast, the users A and D who select "wanting to eat X" and the user B who selects "wanting to eat X'" are highly likely to be able to eat Okonomiyaki and Monjayaki at an Okonomiyaki restaurant, and one destination 5 can therefore be proposed when the similarity level is not lower than a predetermined threshold even with different abstract desired experiences that are sub-categories of genres. Accordingly, the community generation unit 12 determines that the users A, B, and D are users who transmit the experience information having the similarity level not less than the predetermined threshold and groups the users A, B, and D into a single community.

The similarity level of experience information determined by the community generation unit 12 is preferably set in accordance with whether or not the destination 5 finally proposed by the destination proposal unit 13 is common. As in the above-described example, in the genre of meal, a criterion for determining whether or not the food can be serviced in the same restaurant is preferably set as the predetermined threshold. In the genre of sightseeing spots, the sub-categories include cultural sightseeing spots such as shrines and temples, natural landscapes such as hot springs and mountains, and historical sightseeing spots such as ruins, so the similarity level is preferably set in accordance with whether or not the destination 5 finally proposed by the destination proposal unit 13 is common. Also in the genre of purchase (shopping), the sub-categories include those as to what is mainly desired to be purchased, such as whether it is a bag, a wallet, or clothes, so the similarity level is preferably set in accordance with whether or not the destination 5 finally proposed by the destination proposal unit 13 is common.

The community generation unit 12 determines the similarity level of experience information to generate a single community, but may take into account the information on the current locations of the terminals 2 or the desired boarding locations in addition to the similarity level of experience information. In the example of the users A to E illustrated in FIG. 3, the current location of each terminal 2 (desired boarding location) is within a nearby area of a latitude of 33° to 35° north and a longitude of 139° to 141° east and, therefore, provided that the similarity level of experience information is not lower than a predetermined threshold, even when a single community is generated and a vehicle is allocated, it will not take much time to reach the destination 5. However, when there is a user located at the current location apart from the users A to E by a predetermined threshold or more (or when there is a user who desires to board at that location), such a user may be excluded from the single community. In the system according to one or more embodiments of the present invention, the first purpose is to extract users who desire the same or similar experience and propose a destination 5 to these users, but the second purpose is to allocate a transport service vehicle that travels to the destination 5. Thus, when a transport service vehicle is allocated, if it takes an unduly long time to go to the destination 5 while picking up a user at a distant place, this may be disadvantageous for other users who constitute the community.

The community generation unit 12 determines the similarity level of experience information to generate a single community, but may further take into account the information regarding a range of the destination desired by each user in addition to the similarity level of experience information and the above-described information on the current locations of the terminals 2 or desired boarding locations. In the example illustrated in FIG. 3, the three users A, B, and D desire the range of a destination within Kanagawa while the users C and E desire the range of a destination within Tokyo. Thus, the range of destinations desired by the users A, B, and D and the range of destinations desired by the users C and E are different, and a common destination 5 cannot be proposed. When generating a single community for the users A, B, and D, therefore, another community for the users C and E may be taken into account.

The community generation unit 12 determines the similarity level of experience information to generate a single community, but may further take into account the information regarding a time slot for use desired by each user in addition to the similarity level of experience information and the above-described information on the current locations of the terminals 2 or desired boarding locations. In the example illustrated in FIG. 3, the three users A, B, and D desire 15:00 to 16:00 or afternoon as the time slot for use while the users C and E desire night as the time slot for use. Thus, the time slot for use desired by the users A, B, and D and the time slot for use desired by the users C and E are different, and a common destination 5 cannot be proposed. When generating a single community for the user A, B, and D, therefore, another community for the users C and E may be taken into account.

The community generation unit 12 determines the similarity level of experience information to generate a single community, but may further take into account user attribute information including the gender and age of each user in addition to the similarity level of experience information. In the example illustrated in FIG. 3, the three users A, B, and D are all females in their 20s from English-speaking countries of the United States or Canada while the users C and E are males in their 20s or 30s both from non-English-speaking countries of China. Thus, although not particularly concluded, when the users A, B, and D are grouped even into a single community, they are expected to share a ride relatively well to the destination 5 because the user attributes such as gender, age, and language are common.

The following description will be made on the assumption that, as described above, the users A, B, and D among the users A to E illustrated in FIG. 3 transmit the abstract desired experience, which is a sub-category of the genre, of "wanting to eat Okonomiyaki X" or a similar desired experience of "wanting to eat Monjayaki X'" and the community generation unit 12 groups the users A, B, and D into a single community.

The experience/place information storage unit 17 is a database that stores one or more suitable places (destinations 5) in association with the experience information related to the above-described various experiences desired by the users. In the example illustrated in FIG. 3, for the experience information of "wanting to eat Okonomiyaki X" in the genre of meal, the locational information (latitude/longitude) and restaurant name of one or more restaurants that serve Okonomiyaki X are stored in association with the experience information of "wanting to eat X." FIG. 4 is a diagram illustrating an example of the result of destination candidate search executed by the destination proposal unit 13 of the server 1. As illustrated in FIG. 4, for the experience information of "wanting to eat Okonomiyaki X," the experience/place information storage unit 17 stores the locational information (latitude/longitude) and restaurant name of one or more restaurants that serve Okonomiyaki X. The experience/place information storage unit 17 stores not only the locational information of restaurants but also the number of seats in a restaurant, information on items served in a restaurant, and restaurant information such as opening hours of a restaurant. For other genres than the genre of meal, the locational information of a place and the place name are stored in the same manner in association with an abstract experience that is a sub-category of a genre. As illustrated in FIG. 4, when evaluation values of other users for the places are listed (columns of "Gourmet website evaluation" illustrated in FIG. 4), this information may also be stored. As illustrated in FIG. 5, when the experience at a place entails some cost, the budget range may also be stored.

The destination proposal unit 13 includes a destination setting unit as a functional block for setting the destination of the transport service vehicle 4. When a desired facility is selected by a user, the destination proposal unit 13 sets the desired facility selected by the user as the destination of the transport service vehicle 4. When the community generation unit 12 generates a community and a destination is then extracted using the experience/place information storage unit 17, the destination proposal unit 13 sets the extracted destination as the destination of the transport service vehicle 4.

The destination proposal unit 13 extracts a destination 5 associated with the experience information having a similarity level not lower than a predetermined threshold using the experience/place information storage unit 17 which stores the experience information and the destination 5 in association with each other. In the example illustrated in FIG. 3, the community generation unit 12 has grouped the users A, B, and D into a single community, and the destination proposal unit 13 therefore extracts, from the experience/place information storage unit 17, the name and locational information of a place (restaurant) associated with the abstract desired experience, which is a sub-category of the genre, of "wanting to eat Okonomiyaki X" and the name and locational information of a place (restaurant) associated with the similar desired experience of "wanting to eat Monjayaki X'." FIG. 4 is a diagram illustrating an example of the result of destination candidate search executed by the destination proposal unit 13 of the server 1, and a plurality of places (restaurants) and their locational information are extracted.

The destination proposal unit 13 transmits the name and locational information (destination 5) of the extracted place to the terminal 2 used by each of the users A, B, and D who constitute the single community, but may also preliminarily calculate the moving time from each of users A, B, and D to the destination 5 and transmit the moving time together with the above information items. The moving time from each of users A, B, and D to the destination can be calculated from the current location of each of the users A, B, and D and the locational information of the destination 5 using the map information and calculation scheme for a travel route, which are used in the navigation device.

The destination proposal unit 13 transmits the name and locational information (destination 5) of the extracted place to the terminal 2 used by each of the users A, B, and D who constitute the single community, but may also take into account the range of a destination, the desired time slot, the return time, etc. of the desired experience information illustrated in FIG. 3 other than the abstract desired experience which is a sub-category, and transmit only one or more destinations 5 that match these information items after excluding one or more destinations 5 that do not match these information items. In the example illustrated in FIG. 4, restaurant N is located within Machida city, Tokyo, which does not match the range of a destination within Kanagawa desired by the users A, B, and D, and restaurant M matches the range of a destination, but the available reservation time does not match the desired time slot. Accordingly, restaurant L that satisfies all of the abstract desired experience, which is a sub-category, the range of a destination, the desired time slot, the return time, etc. is proposed as the destination 5. The total score of the community illustrated in FIG. 4 refers to a value that quantitatively indicates an overall matching level of the users A, B, and D who constitute the community and ranges from 0 to 100, and destinations 5 are proposed in descending order of the total score. Scores of the users A, B, and D illustrated in FIG. 4 refer to values that quantitatively indicate respective matching levels of the users A, B, and D, and this information may be transmitted to the terminals 2 used by the users A, B, and D.

FIG. 5 is a diagram illustrating an example of the proposed information transmitted from the destination proposal unit 13 of the server 1 to each of the terminals 2 used by the users A, B, and D. As described above, the name, locational information, available reservation time, gourmet site evaluation, and budget range of restaurant L that satisfies all of the desired experiences of the users A, B, and D who constitute the single community, the range of a destination, the desired time slot, the return time, etc., as well as the return time and an overview of the attributes of the users who constitute the community, are transmitted to each of the terminals 2 and displayed thereon. The return time may be calculated as a moving time when each of the users A, B, and D returns from the destination 5 to the current location, in the same manner as when calculating the moving time from each of the users A, B, and D to the destination 5.

The users A, B, and D who have received the proposed information illustrated in FIG. 5 from the destination proposal unit 13 using the terminals 2 may wait for the arrival of the transport service vehicle 4 at the current locations on the assumption that they have accepted the proposed destination 5 (restaurant L). In the system according to one or more embodiments of the present invention, however, the server 1 operates to receive acceptance information that the users A, B, and D accept to go to the proposed destination 5 (restaurant L) or nonacceptance information that they do not accept the proposal, from their terminals 2 via the network 3, and a user of the terminal 2 transmitting the nonacceptance information is excluded from the community. This is because one or more of the users A, B, and D who constitute the community may be satisfied with the desired experiences but may not necessarily be satisfied with other conditions, such as the range of a destination, the desired time slot, and the return time, and the original plan may be changed. Then, when the server 1 receives the acceptance information transmitted from the terminals 2 of the users A, B, and D, the destination proposal unit 13 sets the proposed destination 5 (restaurant L) as the destination of the transport service vehicle 4.

To this end, the vehicle-allocation-schedule generation unit 14 generates a vehicle allocation schedule on the basis of the locational information of the terminal or terminals 2, which have transmitted the acceptance information, among the terminals 2 used by the users A, B, and D who constitute the community. The vehicle allocation schedule includes the travel route of the transport service vehicle 4, the time of arrival at the location of each of the terminals 2 transmitting the acceptance information, and the time of arrival at the proposed destination 5 (restaurant L). The vehicle-allocation-schedule generation unit 14 preferably generates a minimum-distance or minimum-time travel route of the transport service vehicle 4 using a route search function or the like of a conventional navigation device. This travel route is a route along which the transport service vehicle 4 travels from the current location to the destination 5 (restaurant L) via respective current locations of the terminals 2 used by the users A, B, and D who constitute the community (it is assumed that all of them have accepted the destination 5). Then, the vehicle-allocation-schedule generation unit 14 transmits the vehicle allocation schedule illustrated in FIG. 5 to the terminal 2 used by each of the users A, B, and D, and the terminal 2 displays the vehicle allocation schedule.

The vehicle-allocation-schedule generation unit 14 also transmits reservation information to a facility corresponding to the destination 5. The reservation information includes information on the available reservation time included in the acceptance information and the number of persons who transmitted the acceptance information. The reservation information may also include order details. The vehicle-allocation-schedule generation unit 14 transmits information on items that can be served in the restaurant L, to the users who transmitted the acceptance information. Each user checks the item information on the display of the user terminal 2 and selects an item to order. For example, when the user A wants to eat Hiroshima-style Okonomiyaki, the user terminal 2 used by the user A transmits information on the item designated by the user A to the server 1. The vehicle-allocation-schedule generation unit 14 includes information on the order details designated by a user in the reservation information and transmits the reservation information to the destination 5 (restaurant L).

The vehicle-allocation-schedule generation unit 14 has a facility information acquisition unit as a functional block for acquiring information indicating the empty situation of a desired facility. The vehicle-allocation-schedule generation unit 14 acquires facility information indicating the empty situation of a facility from the destination 5 (restaurant L). The empty situation represents a congestion situation in a facility and is represented, for example, by the ratio of the number of seats that are not occupied by customers to the number of seats in the restaurant. In a restaurant at the destination 5, a system for managing the empty situation is provided. As an example of the system, cameras are provided in a restaurant, and the system in the restaurant operates to manage the empty situation through calculating the number of empty seats by image analysis using the camera images. The empty situation management system is not limited to a system using cameras and may also be another known system. After accepting the order, the system in the restaurant operates to include the time for providing an item or service in the facility information and transmits it to the server 1. For example, in an Okonomiyaki restaurant, the time for providing an item or service corresponds to a time period from the order confirmation time when the order from a customer is confirmed to the time when Okonomiyaki is provided to the customer.

The vehicle-allocation-schedule generation unit 14 acquires information on the empty situation included in the facility information and calculates the estimated arrival time at the destination 5 on the basis of the empty situation. For example, provided that the vehicle arrives at the restaurant L at 15:00 as scheduled in the vehicle allocation schedule illustrated in FIG. 5, when the empty situation of the restaurant L indicates congestion at 15:00, the users are expected to wait until Okonomiyaki is served even though the users have arrived at the restaurant L. In such a case, as user psychology, it is less stressful to extend the traveling time of the vehicle and extend the riding time on the traveling vehicle than to wait until Okonomiyaki is served in the restaurant. The vehicle-allocation-schedule generation unit 14 therefore changes the estimated arrival time by adding a waiting time determined in accordance with the empty situation in the restaurant to the arrival time at the destination L scheduled in the vehicle allocation schedule. The smaller the number of empty seats in the restaurant, the longer the waiting time determined in accordance with the empty situation. In the example of the vehicle allocation schedule illustrated in FIG. 5, when the waiting time determined in accordance with the empty situation is 30 minutes, the vehicle-allocation-schedule generation unit 14 changes the arrival time from 15:00 to 15:30. In addition, the vehicle-allocation-schedule generation unit 14 transmits the reservation information to the restaurant L with the changed arrival time as the reservation time for the restaurant L.

The autonomous driving control unit 15 acquires the locational information and temporal information included in the vehicle allocation schedule generated by the vehicle-allocation-schedule generation unit 14 and executes, on the transport service vehicle 4, the control for achieving the travel route from the vehicle allocation center to the destination 5 (restaurant L) via current locations P1, P2, and P3 of the users A, B, and D. Alternatively, the vehicle-allocation-schedule generation unit 14 may transmit the locational information and temporal information included in the vehicle allocation schedule generated by the vehicle-allocation-schedule generation unit 14 to the onboard control device of the transport service vehicle 4, and the onboard control device may execute the autonomous driving control. The vehicle information storage unit 18 included in the server 1 is a database that stores information regarding the vehicle state of the transport service vehicle 4, which is transmitted from various sensors included in the transport service vehicle 4, and map data and the like necessary when generating the travel route.

The transport service vehicle 4 operates to control the travel so as to travel as scheduled in the vehicle allocation schedule on the basis of the control command from the autonomous driving control unit 15. The transport service vehicle 4 includes an arrival time adjustment unit as a functional block for adjusting the arrival time at the destination 5. The transport service vehicle 4 operates to acquire the control command for traveling as scheduled in the vehicle allocation schedule during the travel of the transport service vehicle 4 and execute the travel control (speed control and steering control) on the basis of the control command. In this operation, when the control command includes a command for adjusting the estimated arrival time, the transport service vehicle 4 operates to change the vehicle speed and/or the travel route so that the vehicle 4 can arrive at the changed arrival time.

As described above, the server 1 uses the vehicle-allocation-schedule generation unit 14 to generate the vehicle allocation schedule and uses the autonomous driving control unit 15 to control the transport service vehicle 4 on the basis of the vehicle allocation schedule, thereby managing the transport service vehicle 4. It suffices that the management of the transport service vehicle 4 executed by the server 1 includes at least creation of the vehicle allocation schedule. That is, the server 1 operates to transmit information on the vehicle allocation schedule to the transport service vehicle 4, which operates to control the vehicle speed, steering angle, and other appropriate parameters so as to travel as scheduled in the vehicle allocation schedule. Thus, the server 1 operates to manage the transport service vehicle 4. In addition, the server 1 operates to generate the vehicle allocation schedule on the basis of the facility information including the empty situation of the restaurant L and adjust the arrival time at the destination 5 via the transport service vehicle 4.

Figure 7:
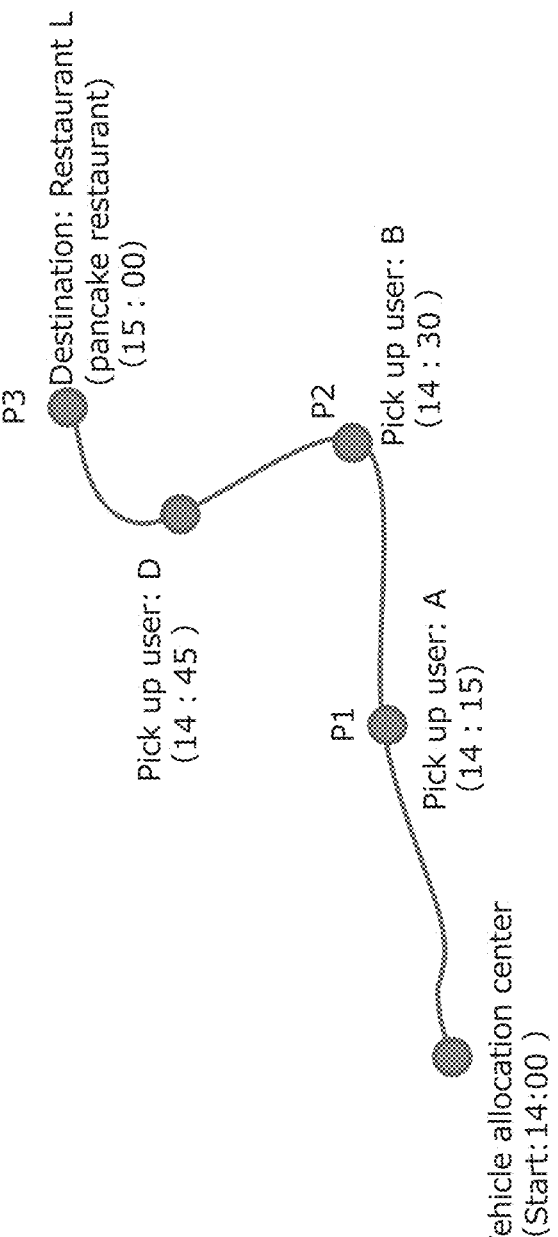
FIG. 7 is a diagram illustrating an example of a travel route based on the vehicle allocation schedule transmitted from an autonomous driving control unit to a transport service vehicle (autonomous driving automobile).

FIG. 6 is a diagram illustrating an example of the vehicle allocation schedule generated by the vehicle-allocation-schedule generation unit 14, and FIG. 7 is a diagram illustrating an example of the travel route based on the vehicle allocation schedule transmitted from the autonomous driving control unit 15 to the transport service vehicle 4 (autonomous driving automobile). The transport service vehicle 4 departs a vehicle allocation center at 14:00, arrives at a point P1 for the user A to wait at 14:14 and picks up the user A, departs the point P1 at 14:15, arrives at a point P2 for the user B to wait at 14:29 and picks up the user B, departs the point P2 at 14:30, arrives at a point P3 for the user D to wait at 14:44 and picks up the user D, departs the point P3 at 14:45, and arrives at the restaurant L, which is the destination 5, at 15:00.

Figure 2:
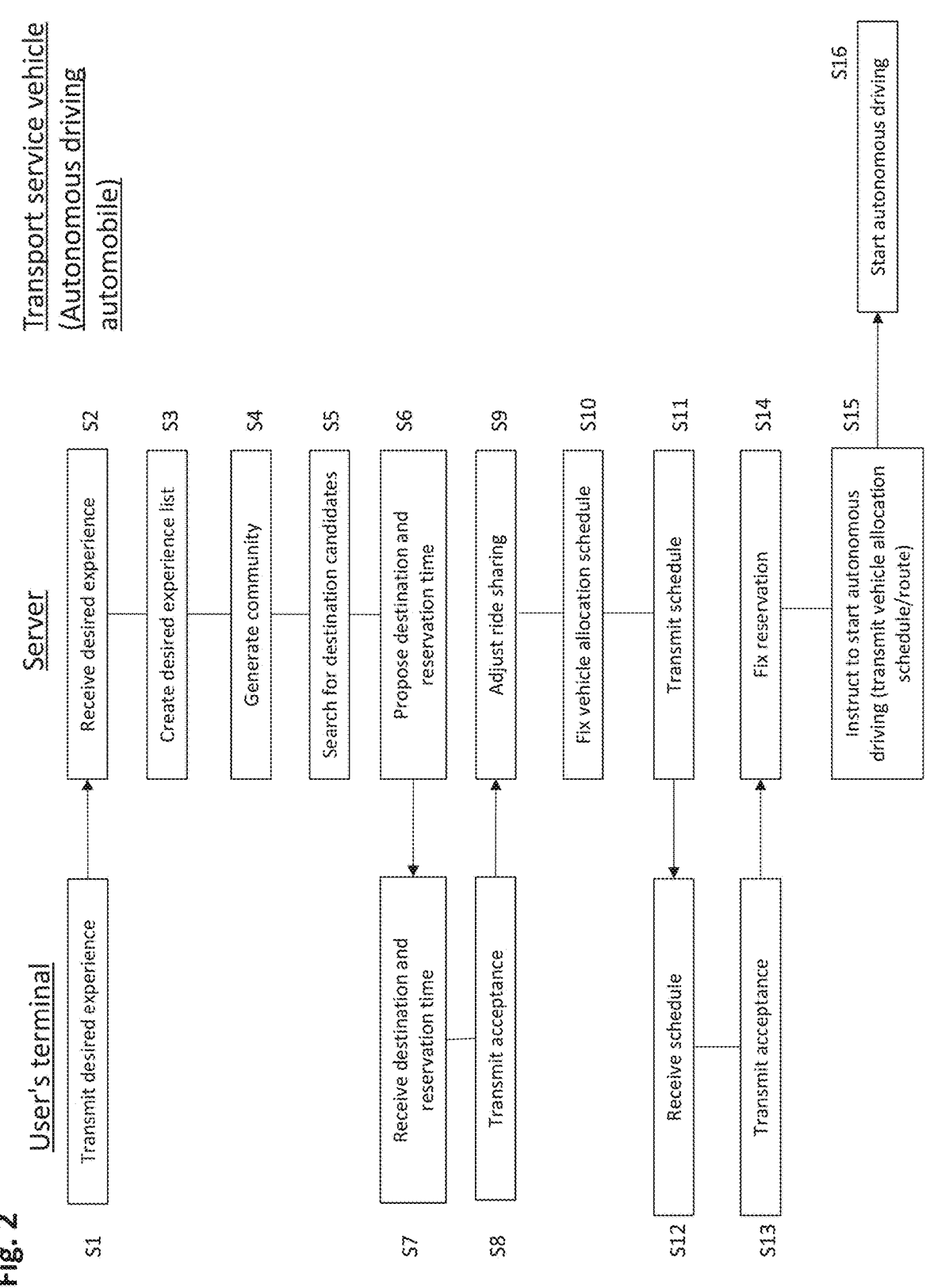
FIG. 2 is a flowchart illustrating an information processing procedure executed in the vehicle management system of FIG. 1.

The outline of an information processing procedure executed in the system according to one or more embodiments of the present invention will then be described. FIG. 2 is a flowchart illustrating the information processing procedure.

First, in step S1, when a user accesses the server 1 using the terminal 2, the terminal 2 used by the user displays a screen with which the user can input, as the above-described information regarding a desired experience, a genre and abstract desired experience information that is a sub-category of the genre, the range of a destination, the boarding location, the deboarding location, the desired time slot for the desired experience, the return time to the deboarding location, the desired budget, etc., and the user inputs the information regarding the desired experience for each item. In addition, the latitude and longitude are detected by a location detection sensor such as a GPS receiver provided in the terminal 2, and this locational information is transmitted to the desired experience reception unit 11 of the server 1 together with the information regarding the desired experience.

In step S2, the desired experience reception unit 11 of the server 1 receives the above information, which is transmitted from the terminal 2 used by each of a plurality of users, via the network 3 at a predetermined time interval (e.g., 100 msec). As illustrated in FIG. 3, the information transmitted from a terminal 2 includes, in addition to the ID of the user who owns the terminal 2, a genre and abstract desired experience information that is a sub-category of the genre, the range of a destination, the boarding location, the deboarding location, the desired time slot for a desired experience, the return time to the deboarding location, the desired budget, etc. as information regarding the desired experience.

In step S3, the community generation unit 12 of the server 1 virtually lists the information regarding the desired experiences from users received by the desired experience reception unit 11 as illustrated in FIG. 3. Step S3 is followed by step S4, in which the community generation unit 12 extracts the users, who transmitted the experience information having a similarity level not lower than a predetermined threshold, to generate a single community for the experience information of the users. In the system according to one or more embodiments of the present invention, the community generation unit 12 generates a single community by taking into account, in addition to the similarity level of experience information, the information on the current locations of the terminals 2 or the desired boarding locations, the information regarding a range of the destination desired by each user, the information regarding a time slot for use desired by each user, and the user attribute information including the gender and age of each user. Through this operation, for the users A to E illustrated in FIG. 3, the users A, B, and D who transmitted the abstract desired experience, which is a sub-category of the genre, of "wanting to eat Okonomiyaki X" or a similar desired experience of "wanting to eat Monjayaki X'" are grouped into a single community.

In step S5, the destination proposal unit 13 of the server 1 extracts a destination 5 associated with the experience information having a similarity level not lower than a predetermined threshold using the information in which the experience information stored in the experience/place information storage unit 17 is associated with the destination 5. In the example illustrated in FIG. 3, the users A, B, and D have been grouped into a single community, and the destination proposal unit 13 therefore extracts, from the experience/place information storage unit 17, the name and locational information of a place (restaurant) associated with the abstract desired experience, which is a sub-category of the genre, of "wanting to eat Okonomiyaki X" and the name and locational information of a place (restaurant) associated with the similar desired experience of "wanting to eat Monjayaki X'." As a result, a determination is made that the restaurant L illustrated in FIG. 4 is suitable for the destination 5.

In step S6, the destination proposal unit 13 of the server 1 transmits the proposed information illustrated in FIG. 5 to each of the terminals 2 used by the users A, B, and D. Then, in step S7, each of the terminals 2 displays the name, locational information, available reservation time, gourmet site evaluation, and budget range of restaurant L that satisfies all of the desired experiences of the users A, B, and D who constitute the single community, the range of a destination, the desired time slot, the return time, etc., as well as the return time and an overview of the attributes of the users who constitute the community.

In step S8, each of the users A, B, and D uses the terminal 2 to determine whether or not to accept the proposed destination 5 (restaurant L) and transmit acceptance information upon a determination of acceptance or nonacceptance information upon a determination of nonacceptance to the server 1. The user who owns a terminal 2 that has transmitted the nonacceptance information is excluded from the community, and the process returns to step S1 for that user. The following description will be made on the assumption that all the users A, B, and D who constitute the community have transmitted the acceptance information in step S8.

In step S9, the vehicle-allocation-schedule generation unit 14 of the server 1 adjusts the ride-sharing of the transport service vehicle 4 on the basis of the locational information of each of the terminals 2 used by the users A, B, and D who constitute the community, that is, as illustrated in FIG. 6, generates the vehicle allocation schedule which includes the travel route of the transport service vehicle 4, the time of arrival at each of the current locations P1, P2, and P3 of the terminals 2 used by the three users A, B, and D, and the time of arrival at the proposed destination 5 (restaurant L), and fixes the vehicle allocation schedule in step S10.

In step S11, the vehicle-allocation-schedule generation unit 14 of the server 1 transmits the vehicle allocation schedule illustrated in FIG. 5 to the terminal 2 used by each of the users A, B, and D, and the terminal 2 displays the vehicle allocation schedule in step S12. This allows each of the users A, B, and D to perceive the arrival time of the transport service vehicle 4; therefore, in step S13, each of the users A, B, and D determines whether or not to accept the vehicle allocation schedule and transmits acceptance information upon a determination of acceptance or nonacceptance information upon a determination of nonacceptance to the server 1. The user who owns a terminal 2 that has transmitted the nonacceptance information is excluded from the community, and the process returns to step S1 for that user. The following description will be made on the assumption that all the users A, B, and D who constitute the community have transmitted the acceptance information in step S13. Then, in step S14, the vehicle-allocation-schedule generation unit 14 of the server 1 determines that the reservation of the vehicle allocation schedule has been completed.

In step S15, the autonomous driving control unit 15 acquires the locational information and temporal information included in the vehicle allocation schedule generated by the vehicle-allocation-schedule generation unit 14 and executes, on the transport service vehicle 4, the control for achieving the travel route, as illustrated in FIG. 7, from the vehicle allocation center to the destination 5 (restaurant L) via the current locations P1, P2, and P3 of the users A, B, and D. In step S16, the transport service vehicle 4 starts the autonomous driving to execute the transport service in accordance with the control command from the autonomous driving control unit 15.

Figure 8:
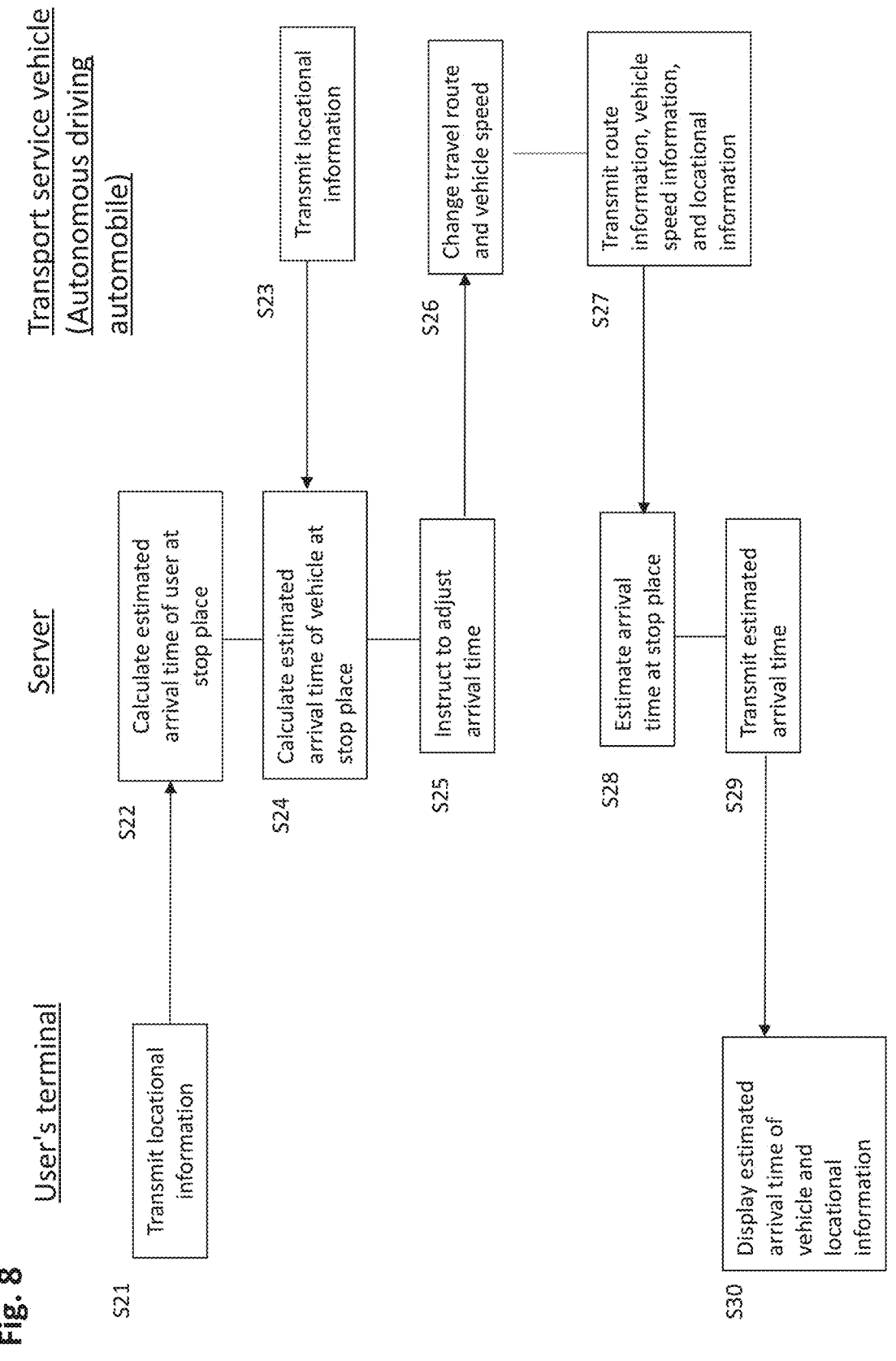
FIG. 8 is a flowchart illustrating an information processing procedure executed in the vehicle management system of FIG. 1.

An information processing procedure when starting the transport service vehicle 4 and picking up the users A, B, and D will then be described. FIG. 8 is a flowchart illustrating the information processing procedure.

In step S21, the terminals 2 transmit the information on the current locations to the server 1. In step S22, the vehicle-allocation-schedule generation unit 14 calculates an estimated arrival time of each of the users at a stop place. The stop place is a stop position of the transport service vehicle 4 when picking up each of the users. In step S23, the transport service vehicle 4 transmits the information on the current location to the server 1.

In step S24, the vehicle-allocation-schedule generation unit 14 acquires the current traffic information, calculates the travel time from the current location of the transport service vehicle 4 to the stop place, and calculates the estimated arrival time at the stop location.

In step S25, when the estimated arrival time calculated in the information processing of step S22 is different from the estimated arrival time calculated in the information processing of step S24, the vehicle-allocation-schedule generation unit 14 transmits a command for adjusting the estimated arrival time to the transport service vehicle 4. In addition, the vehicle-allocation-schedule generation unit 14 outputs information on the vehicle allocation schedule including the calculated estimated arrival time to the autonomous driving control unit 15. The autonomous driving control unit 15 transmits the travel route information and the vehicle speed information to the transport service vehicle 4 so that the transport service vehicle 4 can travel to follow the adjusted vehicle allocation schedule. Thus, the server 1 instructs the transport service vehicle 4 to adjust the arrival time at the stop place.

In step S26, the transport service vehicle 4 changes the travel route and the vehicle speed during travel along the route. The vehicle speed or travel route of the transport service vehicle 4 is appropriately changed in accordance with the actual travel situation of the vehicle. In step S27, the transport service vehicle 4 transmits the changed travel route information, vehicle speed information, and locational information to the server 1.

In step S28, the vehicle-allocation-schedule generation unit 14 calculates the travel time from the current location of the transport service vehicle 4 to the stop place using the acquired current location and vehicle speed of the transport service vehicle 4 and estimates the arrival time at the stop place. In step S29, the vehicle-allocation-schedule generation unit 14 transmits information on the estimated arrival time and current location of the vehicle to the terminals 2. In step S30, the terminals 2 display the estimated arrival time and the current location of the transport service vehicle 4 on their displays.

Figure 9:
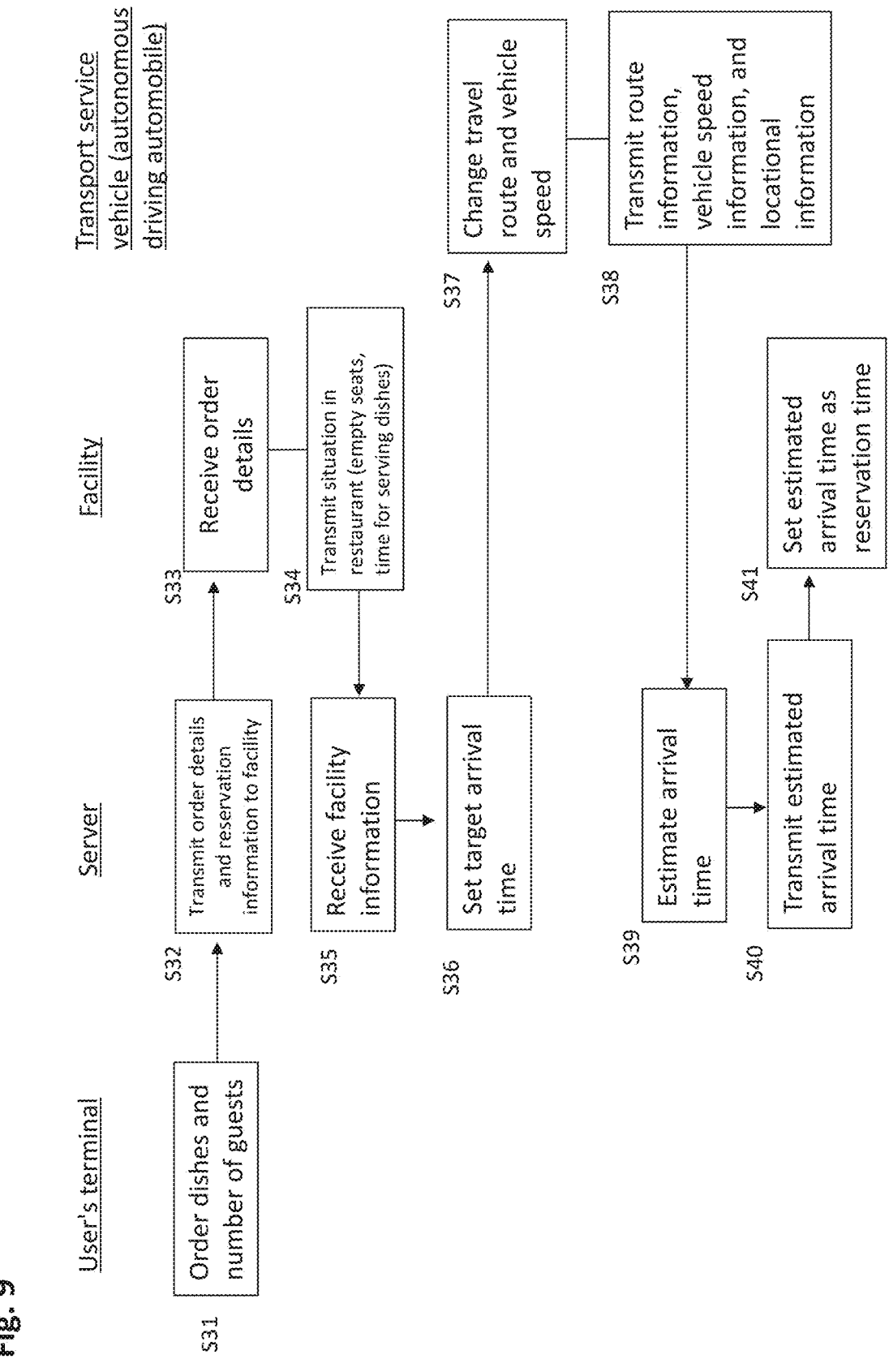
FIG. 9 is a flowchart illustrating an information processing procedure executed in the vehicle management system of FIG. 1.

An information processing procedure during travel of the transport service vehicle 4 will then be described. FIG. 9 is a flowchart illustrating the information processing procedure. The control flow illustrated in FIG. 9 is repeatedly executed at a predetermined cycle.

In step S31, the terminals 2 display information on the dishes served in the facility of the destination L and request the users to select dishes. The terminals 2 select dishes on the basis of the users' operation. In addition, the terminals 2 receive input of the number of guests from the users. The terminals 2 order the dishes by transmitting the information on the number of guests and the selected dishes to the server 1. The order for dishes may be executed by each of the terminals 2 used by the users who are aboard the transport service vehicle 4. When the order for dishes is executed by each of the terminals 2, the output of the number of guests may be omitted in the process of step S31.

In step S32, the vehicle-allocation-schedule generation unit 14 of the server 1 transmits the reservation information and the information on the order details to the facility (restaurant L). The reservation information includes information on the number of guests and the arrival time. The arrival time is the time estimated in the information processing of step S28.

In step S33, the management system provided in the facility (restaurant L) receives the order details and the reservation information and accepts the reservation under the condition indicated in the reservation information. Note, however, that the reservation at this time is a provisional reservation and, in particular, the reservation start time is determined in the subsequent processing.

In step S34, the management system in the facility (restaurant L) transmits facility information indicating the situation in the restaurant to the server 1. The facility information includes information indicating the empty situation of the facility and information on the time for serving the dishes. The facility information also includes information indicating the cooking situation, such as a video footage of the kitchen. FIG. 10 is a diagram illustrating an example of the facility information managed in the facility (restaurant L). The facility information is represented by a reservation number, a reserving person's name, a table number, an arrival time, a status, and an estimated exit time. When accepting the reservation from a user, the management system records the reservation number, the reserving person's name, the table number, and the reservation time in a database. Cameras of the management system capture images of the situation of each table, and the management system confirms the customer status from the captured images. The management system manages "under accounting," "having meals," "waiting for dishes," etc. as the status indicating the current situation of guests. The management system calculates the estimated exit time of guests on the basis of the reservation time and the status. For example, the guest with the reservation number "1" reserves 14:00 to 16:00 as the arrival time, and the current status is under accounting, so the time after a certain time (e.g., 15 minutes) from the current time (e.g., 15:15), for example, is calculated as the estimated exit time. The management system in the facility (restaurant L) then outputs the calculated estimated exit time, as one of information items indicating the empty situation of the facility, to the server 1.

In step S35, the vehicle-allocation-schedule generation unit 14 receives the facility information. In step S36, the vehicle-allocation-schedule generation unit 14 sets a target arrival time on the basis of the facility information. Specifically, the vehicle-allocation-schedule generation unit 14 calculates a waiting time when arriving at the restaurant L at the estimated arrival time, from the empty situation and the time for serving dishes, which are indicated by the facility information. The higher the congestion rate represented by the empty situation is, the longer the waiting time, and the longer the time for serving dishes is, the longer the waiting time. Then, the vehicle-allocation-schedule generation unit 14 sets the target arrival time by adding the waiting time to the arrival time estimated in the information processing of step S28. Thus, the arrival time is adjusted on the basis of the facility situation. In addition, the vehicle-allocation-schedule generation unit 14 adjusts the vehicle allocation schedule so that the vehicle arrives at the set target arrival time. The vehicle allocation schedule is adjusted by changing the route and/or changing the vehicle speed when traveling along the route. The vehicle-allocation-schedule generation unit 14 outputs information on the adjusted vehicle allocation schedule to the autonomous driving control unit 15. The autonomous driving control unit 15 transmits the travel route information and the vehicle speed information to the transport service vehicle 4 so that the transport service vehicle 4 can travel to follow the adjusted vehicle allocation schedule.

The vehicle-allocation-schedule generation unit 14 acquires the facility information at a predetermined cycle from the management system in the facility (restaurant L). When the seats become empty earlier than the estimated arrival time of the transport service vehicle 4 due to the empty situation indicated by the facility information, the target arrival time may be advanced.

In step S37, the transport service vehicle 4 operates to change the travel route and the vehicle speed during travel along the route. The vehicle speed or travel route of the transport service vehicle 4 is appropriately changed in accordance with the actual travel situation, such as the congestion rate (such as due to traffic jam) and the like around the vehicle. In addition, the transport service vehicle 4 operates to display a video footage indicating the cooking situation on the display in the vehicle interior. The users in the vehicle interior can check the video footage to confirm the preparation situation of dishes. In step S38, the transport service vehicle 4 operates to transmit the changed route information, vehicle speed information, and locational information to the server 1.

In step S39, the vehicle-allocation-schedule generation unit 14 calculates the travel time from the current location of the transport service vehicle 4 to the destination using the acquired current location and vehicle speed of the transport service vehicle 4 and estimates the arrival time at the destination. In step S40, the vehicle-allocation-schedule generation unit 14 transmits information on the estimated arrival time to the facility (restaurant L). In step S41, the facility (restaurant L) receives information on the estimated arrival time and sets the estimated arrival time as the reservation time. This allows the reservation to be fixed.

Figure 11:
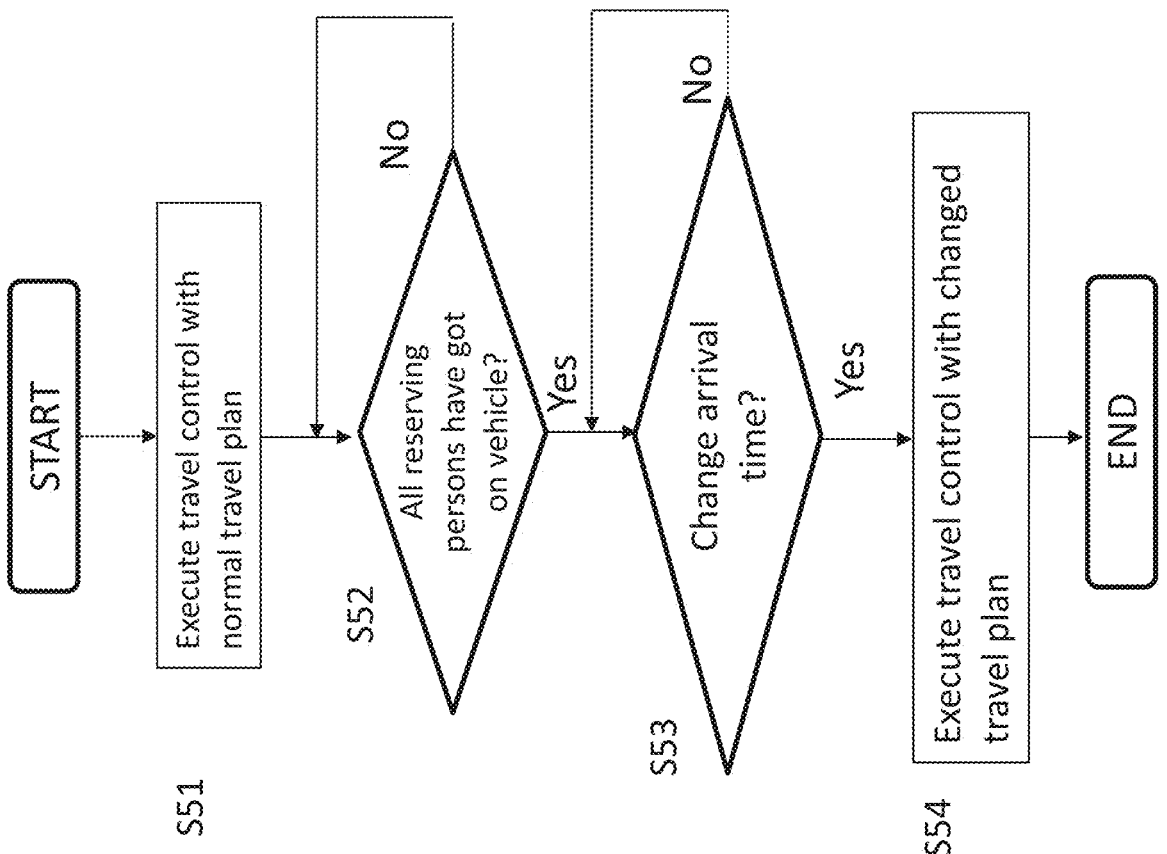
FIG. 11 is a flowchart illustrating an information processing procedure executed in the vehicle management system of FIG. 1.

The outline of an information processing procedure executed in the server 1 from when the transport service vehicle starts to travel until it arrives at the destination will then be described. FIG. 11 is a flowchart illustrating the information processing procedure.

In step S51, the server 1 operates to execute the travel control of the transport service vehicle 4 so that the transport service vehicle 4 travels with a normal travel plan. The travel control includes generation of a vehicle allocation schedule based on the vehicle allocation schedule 14 and control of the vehicle location and vehicle speed executed by the autonomous driving control unit 15. The vehicle allocation schedule includes a first travel plan until the last user of a plurality of users gets on the transport service vehicle 4 and a second travel plan after the last user gets on the transport service vehicle 4. The first travel plan corresponds to the normal travel plan, and the second travel plan corresponds to a changed travel plan, which will be described later. The first travel plan includes a travel route from the departure point of the vehicle to a point at which pickup of all the users is completed, and a stop time at each pickup point. In the example of FIG. 6, the travel plan until the boarding user D gets on the transport service vehicle 4 is the normal travel plan. In the normal travel plan, the arrival time is not adjusted in accordance with the empty situation of the desired facility. Accordingly, the route change and the vehicle speed change are not performed during the travel with the normal travel plan in order to adjust the arrival time.

In step S52, the server 1 operates to determine whether or not all the reserving persons have got on the transport service vehicle 4. The server 1 operates to acquire the locational information of the transport service vehicle 4 which is traveling, and may therefore operate to determine that all the reserving persons have got on the transport service vehicle 4 when the transport service vehicle 4 arrives at the last user's boarding location.

In step S53, the server 1 operates to determine whether or not to change the arrival time at the destination (facility L). The vehicle-allocation-schedule generation unit 14 generates a vehicle allocation schedule for heading to the destination after picking up all the users. Then, during the travel of the vehicle, information indicating the empty situation is acquired from the facility L as the destination, and the arrival time at the destination is adjusted in accordance with the empty situation. The vehicle allocation schedule is changed so that the transport service vehicle 4 arrives at the adjusted arrival time. At this time, the travel plan represented by the changed vehicle allocation schedule is the second travel plan. When changing the arrival time, in step S54, the server 1 operates to execute the travel control of the transport service vehicle 4 so that the transport service vehicle 4 travels to follow the changed travel plan.

As described above, the system according to one or more embodiments of the present invention operates to: acquire, by the server 1, desire information required for determining a desired facility desired by a user via the telecommunications network 3 from the terminal 2 used by the user; set a destination of the vehicle having an autonomous driving function on the basis of the acquired desire information; acquire, by the server 1, facility information including information indicative of an empty situation of the desired facility via the telecommunications network 3; and manage the travel of the vehicle by adjusting an arrival time at which the vehicle arrives at the destination, on the basis of the facility information.

In the case in which users desire to use a facility at a certain reservation time but there are no empty seats in the facility at the reservation time, even when the transport service vehicle 4 arrives at the facility, the users cannot be provided with the service in the facility, and a waiting time occurs. To avoid such a situation, it is conceivable that before the users use the transport service vehicle 4, an order for dishes or the like and a seat reservation are made at the same time. However, if there are no seats at the users' desired time, a reservation cannot be made, so the users will search for another facility. Thus, the restaurant side cannot respond to the users' desire, and a problem arises in that the users' satisfaction with the system is lowered and the usage rate of the system is also lowered.

In one or more embodiments of the present invention, the arrival time at the facility is adjusted in accordance with the empty situation of the facility to manage the transport service vehicle 4, and the users can therefore be provided with the service or item without waiting until the seats become empty after arriving at the facility. If the reserved seats become empty earlier than the estimated time, the estimated arrival time can be advanced earlier than the set reservation time. This can improve the operating rate on the facility side, and the users can use the time well.

In one or more embodiments of the present invention, the server 1 operates to create a vehicle allocation schedule on the basis of the locational information of the terminals 2. The vehicle allocation schedule includes information on the locations at which the users get on the transport service vehicle 4 and information on the arrival time at which the transport service vehicle 4 arrives at the destination. Through this operation, the server side can create the vehicle allocation schedule thereby to reduce the adjustment amount of the vehicle speed and/or vehicle location based on the vehicle allocation schedule, and more smooth travel can thus be achieved.

In one or more embodiments of the present invention, a travel route along which the transport service vehicle 4 travels to arrive at the destination is calculated, and the arrival time is adjusted by changing at least any one of the travel route and the vehicle speed. This allows the vehicle to arrive at an estimated arrival time even when the vehicle may not be able to arrive as scheduled, such as due to the road situation, or the empty situation of the facility changes.

In one or more embodiments of the present invention, the server 1 operates to create the vehicle allocation schedule from when a plurality of users get on the transport service vehicle 4 to share a ride to when the users arrive at the destination, on the basis of the locational information of a plurality of terminals 2 used by the users. This allows the vehicle to arrive at the facility at the timing when seats become empty even in the case in which the vehicle is used to share a ride.

In one or more embodiments of the present invention, the vehicle allocation schedule includes a first travel plan until the last user of a plurality of users gets on the transport service vehicle 4 and a second travel plan after the last user gets on the transport service vehicle 4, and the server operates to change the second travel plan without changing the first travel plan, thereby to adjust the arrival time at the destination. If the travel route is changed to adjust the arrival time before all the users as objects of ride sharing get on the vehicle, the time for one or more users to wait for the vehicle increases. On the other hand, when the travel route is changed after all the users as objects of ride sharing get on the vehicle, uncomfortable feeling given to the users against the vehicle speed adjustment or the route change due to the travel route change can be alleviated because, for example, the users may enjoy an amusing conversation.

In one or more embodiments of the present invention, the server 1 operates to: manage the reservation time for the desired facility; estimate the arrival time at the destination; change the arrival time so as to correspond to the estimated arrival time; and transmit information including the changed arrival time from the server to a device configured to manage the desired facility. If the arrival is delayed, such as due to traffic jam, but the arrival time is not changed, the reserved seats are not used as the arrival is delayed, and the operating rate on the facility side decreases accordingly. On the other hand, in one or more embodiments of the present invention, the reservation time is changed in accordance with the arrival time, and the operating rate on the facility side can therefore be increased.

In one or more embodiments of the present invention, the server 1 acquires temporal information regarding the time for providing a service or item in the desired facility from a device configured to manage the desired facility, and the arrival time is adjusted on the basis of the temporal information. Through this operation, even if the timing of the order from the users in the vehicle interior is delayed and the time for providing an item or service is delayed, for example, the users can be provided with the item or service at the timing when the transport service vehicle 4 arrives. As a result, the operating rate on the facility side can be increased.

In one or more embodiments of the present invention, the server 1 operates to: acquire information representing a cooking situation in the desired facility from a device configured to manage the desired facility; and transmit the information representing the cooking situation from the server 1 to the transport service vehicle 4, and a display provided in the transport service vehicle 4 displays the cooking situation. Through this operation, the preparation situation of the item or service in the facility can be confirmed in the vehicle interior, and the impressive experience given to the users during the travel can be maximized.

In the above description, one or more embodiments of the present invention have been described by exemplifying an eatery such as Okonomiyaki restaurant as the facility, but the system according to one or more embodiments of the present invention may also be applied, for example, to a charging station for electric automobiles. The charging station is provided with a plurality of parking spaces and a rapid charging device in each parking space. A charging management device configured to manage the charging station manages the usage status and usage time of the charging device in each parking space. The usage status is, for example, an "empty state," "charging," "charging completed (vehicle parked)," or the like. The usage time corresponds to the charging time of an onboard battery. For example, when receiving an order and reservation information indicating a desire to use the charging device from the transport service vehicle 4, the charging management device transmits information indicating the empty situation of the charging device to the server 1. If no charging device is available at the reservation time indicated by the reservation information, the charging management device transmits information on the time when the charging device can be used (corresponding to the charging completion time) to the server 1. The vehicle-allocation-schedule generation unit 14 of the server 1 calculates the waiting time when arriving at the charging station at the estimated arrival time. The vehicle-allocation-schedule generation unit 14 sets a target arrival time by adding the waiting time to the estimated arrival time and adjusts the arrival time in accordance with the empty situation of the charging station. The vehicle-allocation-schedule generation unit 14 also adjusts the vehicle allocation schedule so that the vehicle arrives at the set target arrival time.

Moreover, the system according to one or more embodiments of the present invention can be applied not only to the usage form of a vehicle by ride sharing but also to a usage form of heading to a facility with a single user.

In a modified system according to one or more embodiments of the present invention, the users may confirm the empty situation of a facility and designate the arrival time at the facility on the basis of the empty situation, and the server

1 may operate to create the vehicle allocation schedule so that the transport service vehicle 4 arrives at the arrival time which is designated by the users using the terminals 2. For example, the following information processing is executed by the system. First, the server 1 operates to acquire facility information including information on the empty situation of a facility from a device configured to manage the facility. The empty situation is represented by time. The server 1 operates to transmit the facility information including information on the empty situation of the facility to the terminals 2. The terminals 2 display the empty situation of the facility on their displays.

The users check the display screens and designate the reservation time within a vacant time. The terminals 2 transmit information on the reservation time designated by the users and the locational information of the terminals 2 to the server 1. The vehicle-allocation-schedule generation unit 14 of the server 1 generates the vehicle allocation schedule so that the transport service vehicle 4 can arrive at the facility at the reservation time, on the basis of the locational information of the terminals 2 and the reservation time information. That is, the reservation time designated by the users is the arrival time at the destination (facility).

Through this operation, the arrival time can be adjusted to manage the travel of the vehicle so that the vehicle can respond to the reservation time designated by the users, and the convenience for the users can thus be improved.

LIST OF REFERENCE NUMBERS

1 Server
2 Terminal
3 Network
4 Transport service vehicle
5 Destination
11 Desired experience reception unit
12 Community generation unit
13 Destination proposal unit
14 Vehicle-allocation-schedule generation unit
15 Autonomous driving control unit
16 User information storage unit
17 Experience/place information storage unit
18 Vehicle information storage unit

What is claimed is:
1. A vehicle management system comprising:
a server;
a terminal used by a user; and a vehicle having an autonomous driving function, the terminal comprising a transmitter configured to transmit desire information required for determining a desired facility desired by the user to the server,
the server configured to:
acquire location information from a plurality of user terminals;
set a destination of the vehicle on a basis of the desire information;
generate a vehicle allocation schedule based on the location information of the plurality of user terminals, so that a plurality of users get the vehicle to share a ride and arrive at the destination, the vehicle allocation schedule including a first travel plan until the last user among the plurality of users gets on the vehicle, and a second travel plan after the last user gets on the vehicle;
acquire facility information including information indicative of an empty situation of the desired facil- ity and temporal information regarding a time required for providing a service or item in the desired facility;

calculate an estimated arrival time at the destination from a current location of the vehicle;

calculate a waiting time upon arrival at the desired facility at the estimated arrival time, based on the facility information;

set a target arrival time by adding the waiting time to the estimated arrival time; and modify the second travel plan without changing the first travel plan so that the vehicle arrives at the target arrival time; and the vehicle operating, using the autonomous driving function, to travel along the modified second travel plan by changing at least one of the vehicle speed and a travel route included in the modified second travel plan, so that the arrival time at the destination becomes the target arrival time instead of the estimated arrival time.

2. The vehicle management system according to claim 1, wherein the plurality of user terminals operate to transmit location information of the plurality of user terminals to the server, and wherein the vehicle allocation schedule includes information on a location at which each user gets on the vehicle and information on the arrival time at which the vehicle arrives at the destination.

3. The vehicle management system according to claim 1, wherein the server operates to calculate the travel route along which the vehicle travels to arrive at the destination.

4. The vehicle management system according to claim 1, wherein the server operates to:

manage a reservation time for the desired facility;

change the reservation time so as to correspond to the target arrival time; and transmit information including the changed reservation time to a device configured to manage the desired facility.

5. The vehicle management system according to claim 1, wherein the server operates to:

acquire information representing a cooking situation in the desired facility from a device configured to manage the desired facility; and transmit the information representing the cooking situation to the vehicle, and a display provided in the vehicle operates to display the cooking situation.

6. A method of processing information using a controller and a communicator for communicating with an on-vehicle communicator and a communication terminal operated by a user, the method comprising:

acquiring, from a plurality of communication terminals, desire information required for determining a desired facility desired by a plurality of users;

acquiring location information from the plurality of communication terminals;

setting a destination of the vehicle on a basis of the desire information, the vehicle having an autonomous driving function;

generating a vehicle allocation schedule based on the location information of the plurality of communication terminals, so that the plurality of users get the vehicle to share a ride and arrive at the destination, the vehicle allocation schedule including a first travel plan until the last user among the plurality of users gets on the vehicle, and a second travel plan after the last user gets on the vehicle;

acquiring facility information including information indicative of an empty situation of the desired facility and temporal information regarding a time required for providing a service or item in the desired facility;

calculating an estimated arrival time at the destination from a current location of the vehicle;

calculating a waiting time upon arrival at the desired facility at the estimated arrival time, based on the facility information;

setting a target arrival time by adding the waiting time to the estimated arrival time;

modifying the second travel plan without changing the first travel plan so that the vehicle arrives at the target arrival time; and operating the vehicle, using the autonomous driving function, to travel along the modified second travel plan by changing at least one of the vehicle speed and a travel route included in the modified second travel plan, so that the arrival time at the destination becomes the target arrival time instead of the estimated arrival time.

* * * * *